United States Patent
Kakui

(10) Patent No.: US 10,654,115 B2
(45) Date of Patent: May 19, 2020

(54) CUTTER, CRANKSHAFT MILLER AND CRANKSHAFT MANUFACTURING METHOD

(71) Applicant: KOMATSU NTC LTD., Nanto, Toyama (JP)

(72) Inventor: Masanori Kakui, Komatsu (JP)

(73) Assignee: KOMATSU NTC LTD., Toyama (JP)

(*) Notice: Subject to any disclaimer, the term of this patent is extended or adjusted under 35 U.S.C. 154(b) by 92 days.

(21) Appl. No.: 15/855,100

(22) Filed: Dec. 27, 2017

(65) Prior Publication Data

US 2018/0200807 A1    Jul. 19, 2018

(30) Foreign Application Priority Data

Jan. 17, 2017   (JP) ................. 2017-005676

(51) Int. Cl.
  *B23C 3/06*      (2006.01)
  *B21K 1/08*     (2006.01)
  *B23C 5/08*      (2006.01)

(52) U.S. Cl.
  CPC ............ *B23C 3/06* (2013.01); *B21K 1/08* (2013.01); *B23C 5/08* (2013.01); *B23C 2210/503* (2013.01); *B23C 2220/68* (2013.01)

(58) Field of Classification Search
  CPC ..................... B23C 3/06; B23C 2210/503
  See application file for complete search history.

(56) References Cited

U.S. PATENT DOCUMENTS

| | | | | |
|---|---|---|---|---|
| 6,050,757 A | * | 4/2000 | Gesell | B23C 3/06 409/132 |
| 8,141,464 B2 | * | 3/2012 | Shimizu | B23C 3/06 407/42 |
| 2015/0037107 A1 | * | 2/2015 | Buob | B23C 5/08 407/44 |

FOREIGN PATENT DOCUMENTS

JP    2001-293610 A    10/2001

* cited by examiner

*Primary Examiner* — Alan Snyder
(74) *Attorney, Agent, or Firm* — Global IP Counselors, LLP

(57) ABSTRACT

A cutter performs milling on a crankshaft blank having a journal and a counterweight coupled to the journal. The cutter includes an annular main body part, a first chip, and a second chip. The annular main body part is centered on a predetermined axis center. The first chip is attached to a circumferential surface of the main body part and is used to cut an external circumferential surface of the journal. The second chip is attached to the circumferential surface of the main body part and is used to cut a groove on the external circumferential surface of the journal.

9 Claims, 11 Drawing Sheets

CUTTER, CRANKSHAFT MILLER AND CRANKSHAFT MANUFACTURING METHOD

CROSS-REFERENCE TO RELATED APPLICATIONS

This application claims priority to Japanese Patent Application No. 2017-005676 filed on Jan. 17, 2017, the disclosure of which is hereby incorporated herein by reference in its entirety.

BACKGROUND

Field of the Invention

The present invention relates to a cutter, a crankshaft miller and a crankshaft manufacturing method.

Background Art

Conventionally, a crankshaft milling machine is known that performs milling on a crankshaft blank with a cutter (see Japanese Patent Laid-open No. 2001-293610).

A step is performed for cutting the external circumferential surface of a journal and a step is performed for forming grooves at both ends of the external circumferential surface of the journal during the milling of the crankshaft blank.

Two types of cutters are used in the milling: a cutter for cutting the external circumferential surface of the journal, and a cutter for forming the grooves on both ends of the external circumferential surface of the journal.

SUMMARY

However, there is a problem in that work efficiency in the crankshaft milling machine described in Japanese Patent Laid-open No. 2001-293610 is low because there is a need to exchange the two types of cutters in response to the journal width of the crankshaft.

In view of the above conditions, an object of the present invention is to provide a cutter, a crankshaft miller and a crankshaft manufacturing method that enable an improvement in work efficiency of the milling.

A cutter for performing milling on a crankshaft blank having a journal and a counterweight coupled to the journal has an annular main body part, a first chip, and a second chip. The annular main body part is centered on a predetermined axis center. The first chip is attached to a circumferential surface of the main body part and used for cutting an external circumferential surface of the journal. The second chip is attached to the circumferential surface of the main body part and used for cutting a groove on the external circumferential surface of the journal.

According to the present invention, there is provided a cutter, a crankshaft miller and a crankshaft manufacturing method that enable an improvement in work efficiency of the milling.

DETAILED DESCRIPTION OF EMBODIMENT(S)

(Configuration of Crankshaft Miller 1)

Figure 1:
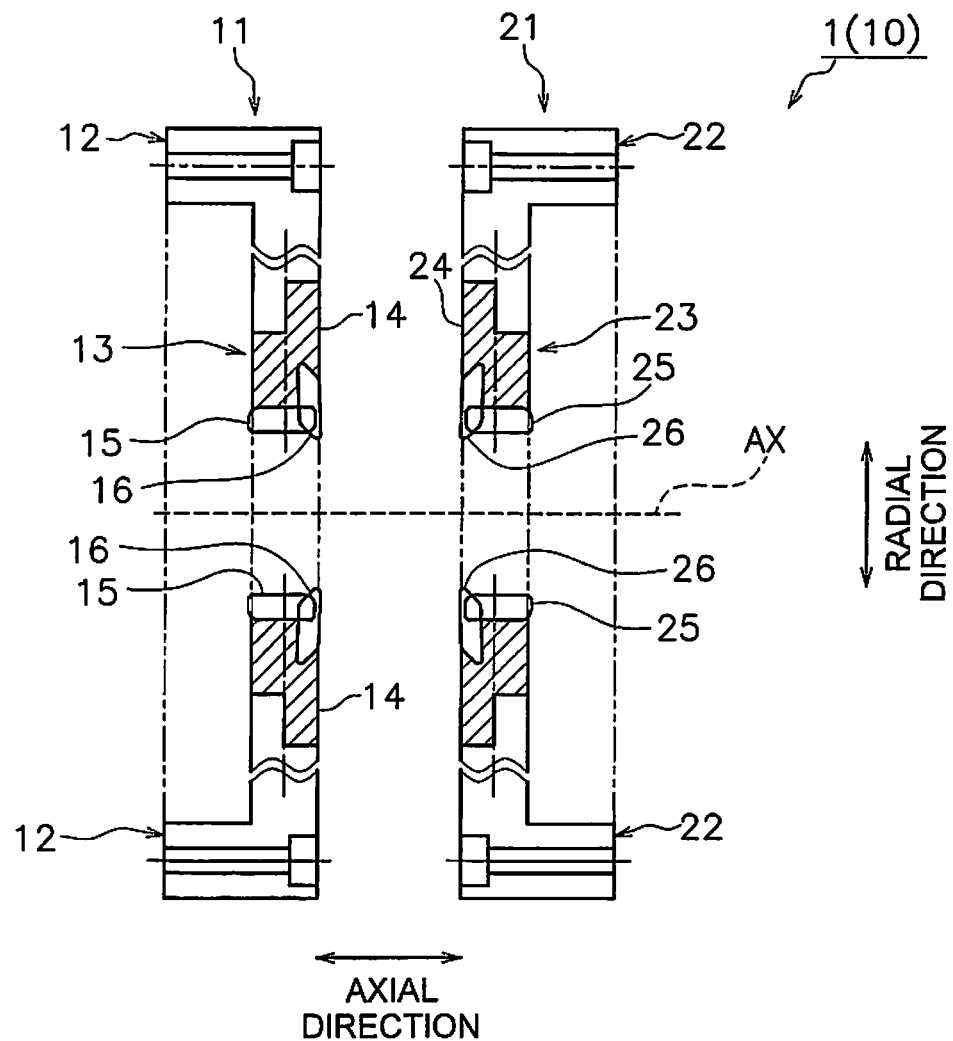
FIG. 1 is a cross-sectional view of a configuration of a cutter unit in the crankshaft miller.
Figure 2:
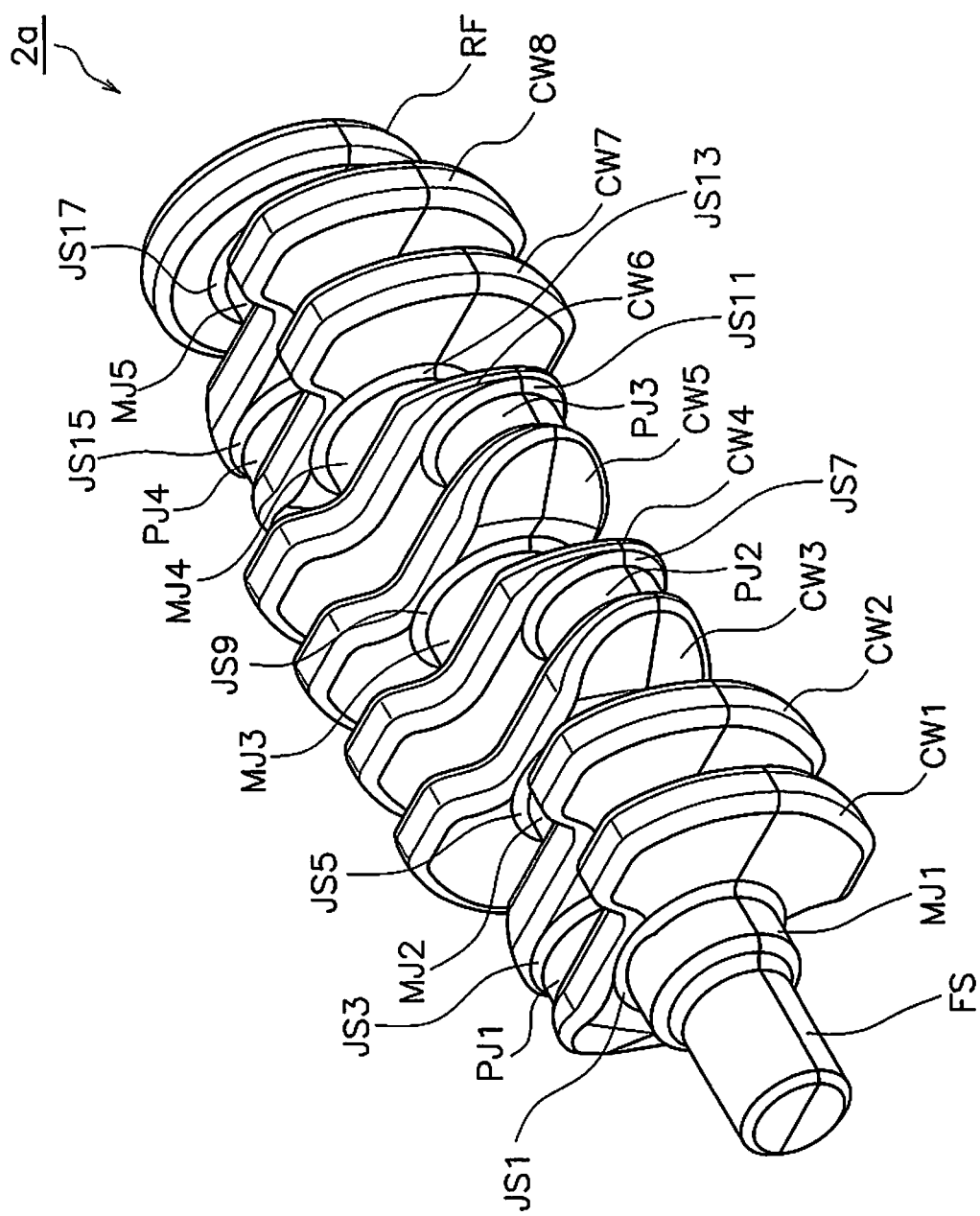
FIG. 2 is a perspective view of a configuration of a crankshaft.

FIG. 1 is a cross-sectional view of a configuration of a cutter unit 10 in a crankshaft miller 1 according to an embodiment. FIG. 2 is a perspective view of a crankshaft 2a fabricated by performing milling on a crankshaft blank (referred to below as "workpiece") 2.

The crankshaft milling machine 1 is a so-called internal type crankshaft milling machine. The crankshaft milling machine 1 performs cutting by using an inner blade type of the cutter unit 10 on the workpiece 2.

The workpiece 2 according to the present embodiment is an untreated crankshaft for an in-line 4-cylinder engine. However, the workpiece 2 is not limited to an untreated crankshaft for an in-line 4-cylinder engine and may be various types of untreated crankshafts for an in-line 3-cylinder engine, an in-line 6-cylinder engine, or an in-line 8-cylinder engine and the like.

The workpiece 2 is disposed along an axis center AX. The workpiece 2 is clamped by a pair of chuck devices which are not depicted in the drawings. The workpiece 2 is formed into a multiaxial rod shape. The workpiece 2 is in an untreated state and is formed larger than the completed product of the crankshaft 2a in consideration of the machining margin.

As illustrated in FIG. 2, the completed product of the crankshaft 2a has a front shaft FS, main journals MJ (first to fifth main journals MJ1-MJ5), pin journals PJ (first to fourth pin journals PJ1-PJ4), counterweights CW (first to eighth counterweights CW1-CW8), a rear flange RF, and journal thrusts JS (first to seventeenth journal thrusts JS1-JS17). However, only nine of the first to seventeenth journal thrusts JS1-JS17 can be seen in FIG. 2.

The pin journals PJ are disposed between two of the main journals MJ. The counterweights CW are disposed between the pin journals PJ and the main journals MJ. The journal thrusts JS are formed between the counterweights CW and the pin journals PJ and between the counterweights CW and the main journals MJ. The main journals MJ and the pin journals PJ each represent examples of "journals" according to the present embodiment.

The cutter unit 10 is disposed between a pair of work heads which are not depicted in the drawings. The workpiece 2 is disposed on the inside of the cutter unit 10. The cutter unit 10 is able to rotate relative to the workpiece 2. A fixed workpiece format may be used in which the cutter unit 10 rotates around the fixed workpiece 2, or a rotating workpiece format may be used in which the workpiece 2 rotates on the inside of the fixed cutter unit 10.

As illustrated in FIG. 1, the cutter unit 10 is provided with a first cutter unit 11 and a second cutter unit 21. The first cutter unit 11 has a first adaptor 12 and a first cutter 13. The second cutter unit 21 has a second adaptor 22 and a second cutter 23.

The first adaptor 12 is formed in an annular shape. The first adaptor 12 is able to move in the direction of an axis parallel to the axis center AX. The first cutter 13 is attached to an opening on the second adaptor 22 side of the first adaptor 12.

The first cutter 13 is fixed to the first adaptor 12. The first cutter 13 can be attached to and detached from the first adaptor 12. The first cutter 13 is a so-called inner blade type of cutter. The first cutter 13 has a plurality of first chips 15 and a plurality of second chips 16 which are attached to the inside of a main body part 14.

As illustrated in FIG. 1, the second chips 16 are disposed on the second cutter 23 side of the first cutter 13. The second chips 16 face the second cutter 23. The configuration of the first cutter 13 is described below.

The second adaptor 22 is formed in an annular shape. The second adaptor 22 is able to move in the axial direction. The second cutter 23 is attached to an opening on the first adapter 12 side of the second adaptor 22.

The second cutter 23 is fixed to the second adaptor 22. The second cutter 23 can be attached to and detached from the second adaptor 22. The second cutter 23 is a so-called inner blade type of cutter. The second cutter 23 has a plurality of first chips 25 and a plurality of second chips 26 attached to the inside of a main body part 24.

The second cutter 23 has a configuration that is similar to that of the first cutter 13. The second cutter 23 has a configuration that is reversed by rotating the first cutter 13 180-degrees. The second chips 26 are disposed on the first cutter 13 side of the second cutter 23. The second chips 26 face the first cutter 13.

(Configurations of the First Cutter 13 and the Second Cutter 23)

Configurations of the first cutter 13 and the second cutter 23 will be explained herein with reference to the drawings. However, as explained above, the second cutter 23 has a similar configuration to that of the first cutter 13. Therefore, the configuration of the first cutter 13 will mostly be discussed below.

Figure 3:
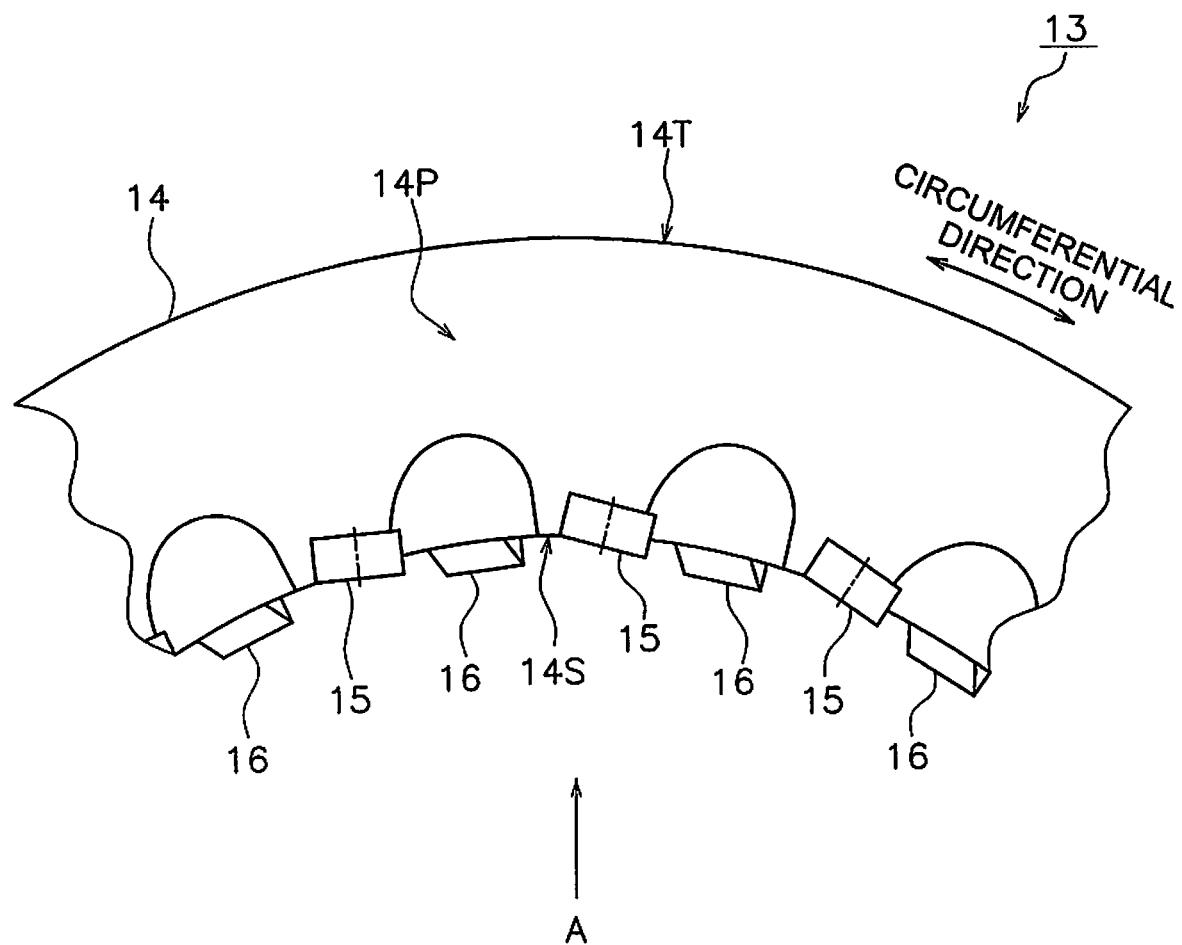
FIG. 3 is an enlarged partial view of a first cutter as seen in a plan view from the side.
Figure 4:
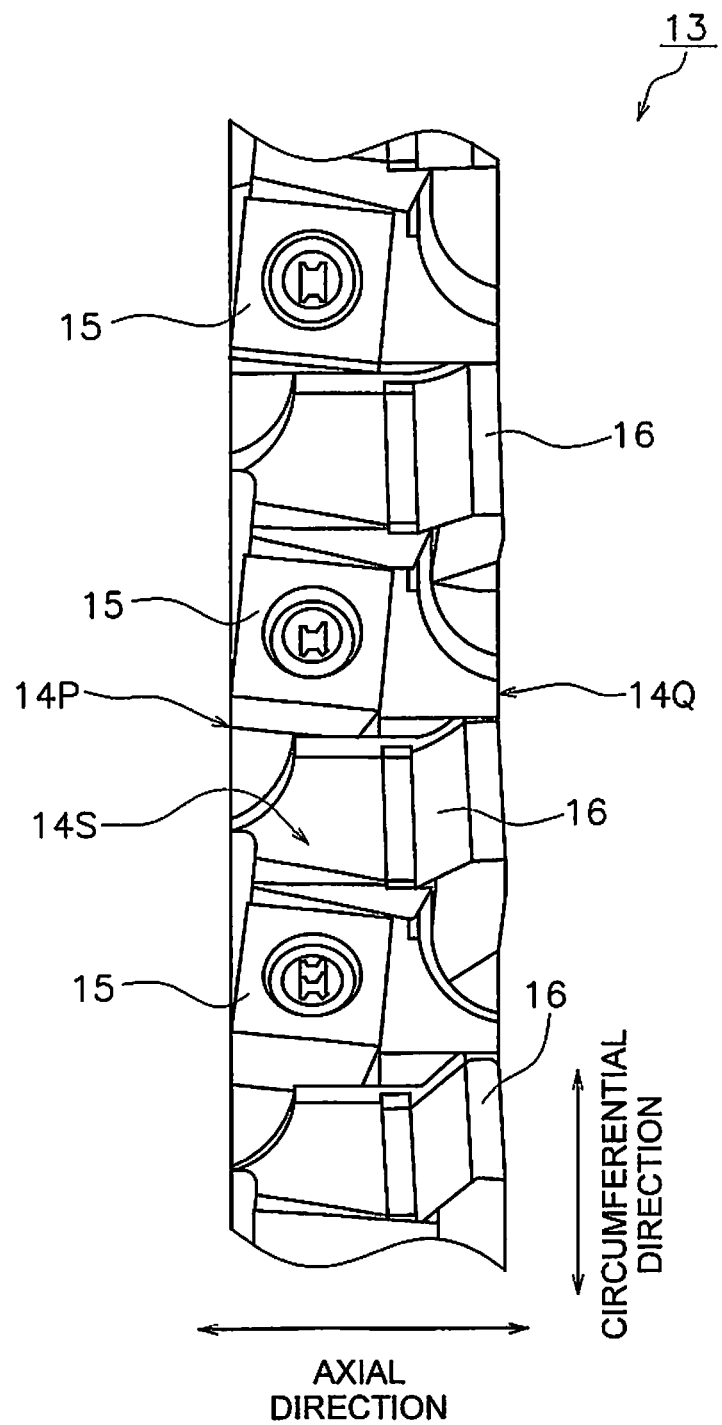
FIG. 4 is an enlarged partial view of the inside of the first cutter as seen in a plan view from the direction of arrow A in FIG. 3.
Figure 5:
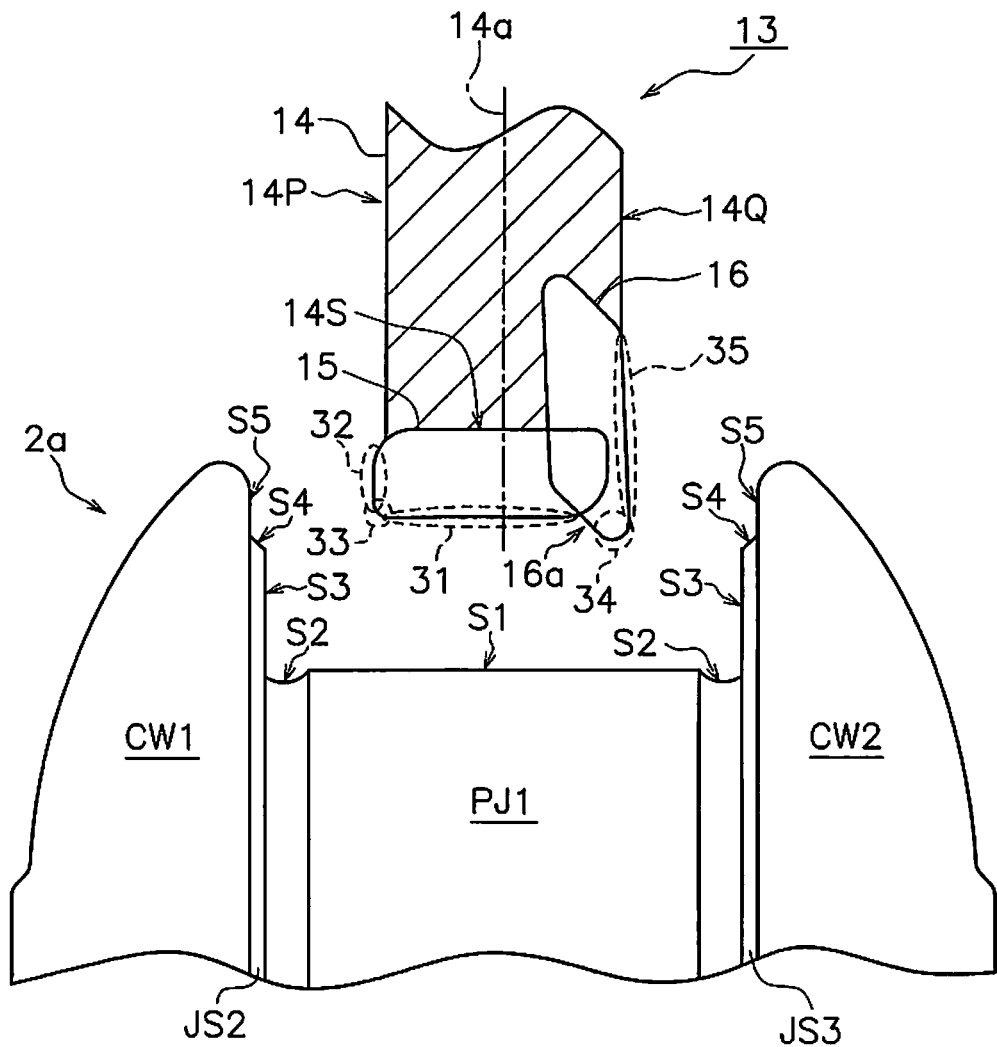
FIG. 5 is a virtual cross-sectional view which depicts a first chip and a second chip overlapping each other in the first cutter.

FIG. 3 is an enlarged partial view of the first cutter 13 as seen in a plan view from the side. FIG. 4 is an enlarged partial view of the inside of the first cutter 13 as seen in a plan view from the direction of "arrow A" in FIG. 3. FIG. 5 is a virtual cross-sectional view which depicts the first chips 15 and the second chips 16 of the first cutter 13 overlapping each other. The first cutter 13 is illustrated in the state of approaching the first pin journal PJ1 in FIG. 5.

The first cutter 13 is a cutting tool for milling the workpiece 2. The first cutter 13 has the main body part 14, the plurality of first chips 15, and the plurality of second chips 16.

The main body part 14 is formed in an annular shape centered on the axis center AX (see FIG. 1). The main body part 14 has an internal circumferential surface 14S, an external circumferential surface 14I, a first side surface 14P, and a second side surface 14Q. The internal circumferential surface 14S and the external circumferential surface 14T extend in the circumferential direction around the axis center AX. The internal circumferential surface 14S is an example of a "circumferential surface" according to the present embodiment. The first side surface 14P and the second side surface 14Q are both joined to the internal circumferential surface 14S and the external circumferential surface 14T. The second side surface 14Q faces the second cutter 23 (see FIG. 1).

The first chips 15 are attached to the internal circumferential surface 14S of the main body part 14. The first chips 15 can be attached and detached with fixing implements such as screws and the like. The first chips 15 are formed as flattened and substantially rectangular shapes. The first chips 15 are disposed horizontally and substantially parallel to the circumferential direction. The number of the first chips 15 may be modified as appropriate.

As illustrated in FIGS. 3 and 4, the first chips 15 are disposed in equal intervals in the circumferential direction. The intervals between the first chips 15 may be modified as appropriate.

As illustrated in FIG. 5, the first chips 15 overlap a center line 14a of the main body part 14 in the axial direction. A portion of each of the first chips 15 is exposed to the first side surface 14P. A portion of each of the first chips 15 protrudes in the axial direction from the first side surface 14P. The first chips 15 are not exposed to the second side surface 14Q.

As illustrated in FIG. 5, the first chips 15 have an external circumferential surface blade part 31, a side surface blade part 32, and a step blade part 33. The external circumferential surface blade part 31 is used for cutting an external circumferential surface S1 of the first pin journal PJ1. The external circumferential surface blade part 31 is provided substantially parallel to the axial direction. The side surface blade part 32 is used for cutting a side surface S5 of the first counterweight CW1. The side surface blade part 32 is provided substantially perpendicular to the axial direction. The step blade part 33 is used for cutting a step S4 of the second journal thrust JS2. The step blade part 33 is joined to the external circumferential surface blade part 31 and the side surface blade part 32. The step blade part 33 is curved or bent at angle that conforms to the step S4. The lower end part of the step blade part 33 may overlap the end part in the axial direction of the external circumferential surface blade part 31. The upper end part of the step blade part 33 may overlap the lower end part of the side surface blade part 32.

The second chips 16 are attached to the internal circumferential surface 14S of the main body part 14. The second chips 16 can be attached and detached with fixing implements such as screws and the like. The second chips 16 are formed in flattened and substantially rectangular shapes. The second chips 16 are disposed vertically and substantially perpendicular to the circumferential direction. The number of the second chips 16 may be modified as appropriate.

As illustrated in FIGS. 3 and 4, the second chips 16 are disposed in equal intervals in the circumferential direction. The intervals between the second chips 16 may be modified as appropriate. The second chips 16 are disposed in an alternating manner with the first chips 15 in the circumferential direction.

As illustrated in FIG. 5, the second chips 16 do not overlap the center line 14a of the main body part 14 in the axial direction. The second chips 16 are located further toward the second cutter 23 side of the main body part 14. The second chips 16 are not exposed to the first side surface 14P. The first chips 15 are exposed to the second side surface 14Q. However, the second chips 16 do not protrude from the second side surface 14Q in the axial direction.

As illustrated in FIG. 5, a tip end part 16a of each second chip 16 protrudes further than the first chips 15 in the radial direction centered on the axis center AX. In the present embodiment, the second chips 16 are attached to the internal circumferential surface 14S of the main body part 14. Consequently, the tip end parts 16a of the second chips 16 protrude further to the inside than the first chips 15.

As illustrated in FIG. 5, the second chips 16 have a groove blade part 34 and a side surface blade part 35. The groove blade part 34 is used for forming a groove S2 at one end part in the axial direction of the external circumferential surface S1 of the first pin journal PJ1. The groove blade part 34 is curved or bent at an angle that conforms to the groove S2. The side surface blade part 35 is used for cutting a side surface S3 of the third journal thrust JS3. The side surface blade part 35 is joined to the groove blade part 34 from above and is provided substantially perpendicular to the axial direction. The side surface blade part 35 is provided flush with the second side surface 14Q of the main body part 14. The lower end part of the side surface blade part 35 may overlap the upper end part of the groove blade part 34.

The configuration of the second cutter 23 is described next. As depicted in FIG. 1, the second cutter 23 has the main body part 24, the plurality of first chips 25, and the plurality of second chips 26.

The main body part 24 of the second cutter 23 has the same configuration as the main body part 14 of the first cutter 13.

The first chips 25 of the second cutter 23 each have the external circumferential surface blade part 31, the side surface blade part 32, and the step blade part 33 in the same way as the first chips 15 of the first cutter 13. The side surface blade part 32 of each first chip 25 is used for cutting the external circumferential surface S1 of the first pin journal PJ1. The side surface blade part 32 of each first chip 25 is used for cutting the side surface S5 of the second counterweight CW2. The step blade part 33 is used for cutting the step S4 of the third journal thrust JS3.

The second chips 26 of the second cutter 23 each have the groove blade part 34 and the side surface blade part 35 in the same way as the second chips 16 of the first cutter 13. The groove blade part 34 of each second chip 26 is used for forming the groove S2 at the other end part in the axial direction of the external circumferential surface S1 of the first pin journal PJ1. The side surface blade part 35 of each second chip 26 is used for cutting the side surface S3 of the second journal thrust JS2.

(Milling Performed by the First Cutter 13 and the Second Cutter 23)

Milling of the workpiece 2 performed by the first cutter 13 and the second cutter 23 will be explained next with reference to the drawings. An example of the milling performed in the vicinity of the first pin journal PJ1 will be explained below.

Figure 6:
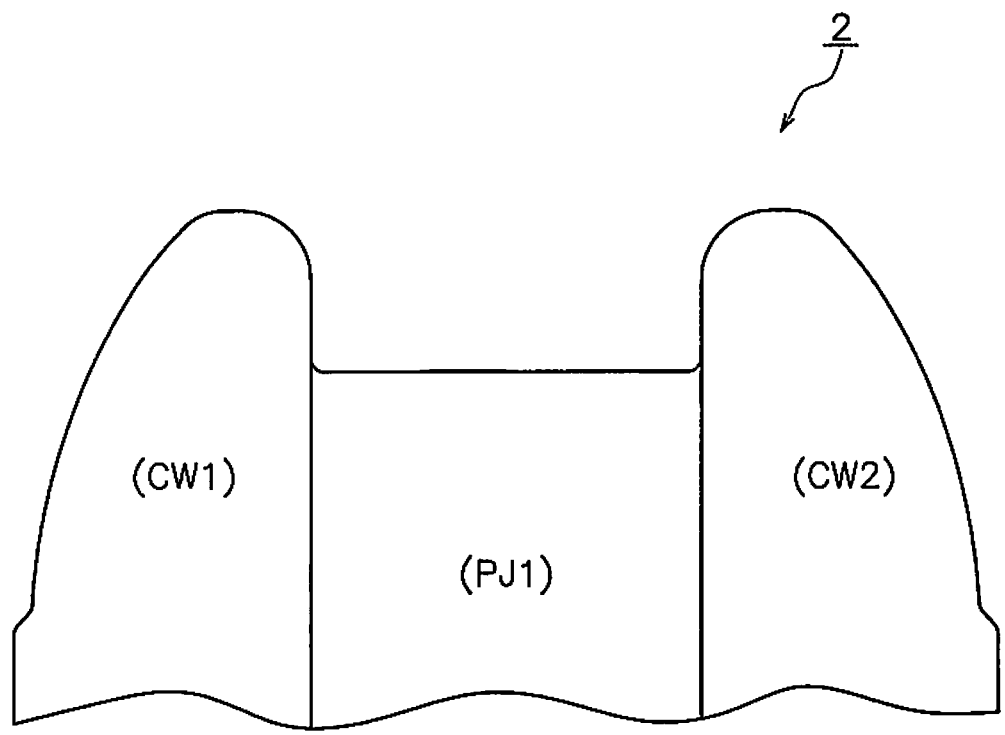
FIG. 6 is a view for explaining milling by the first cutter and a second cutter.

First, the workpiece 2 in an untreated state is prepared as illustrated in FIG. 6. The rough contours of the first pin journal PJ1, the first counterweight CW1, and the second counterweight CW are formed on the workpiece 2.

Figure 7:
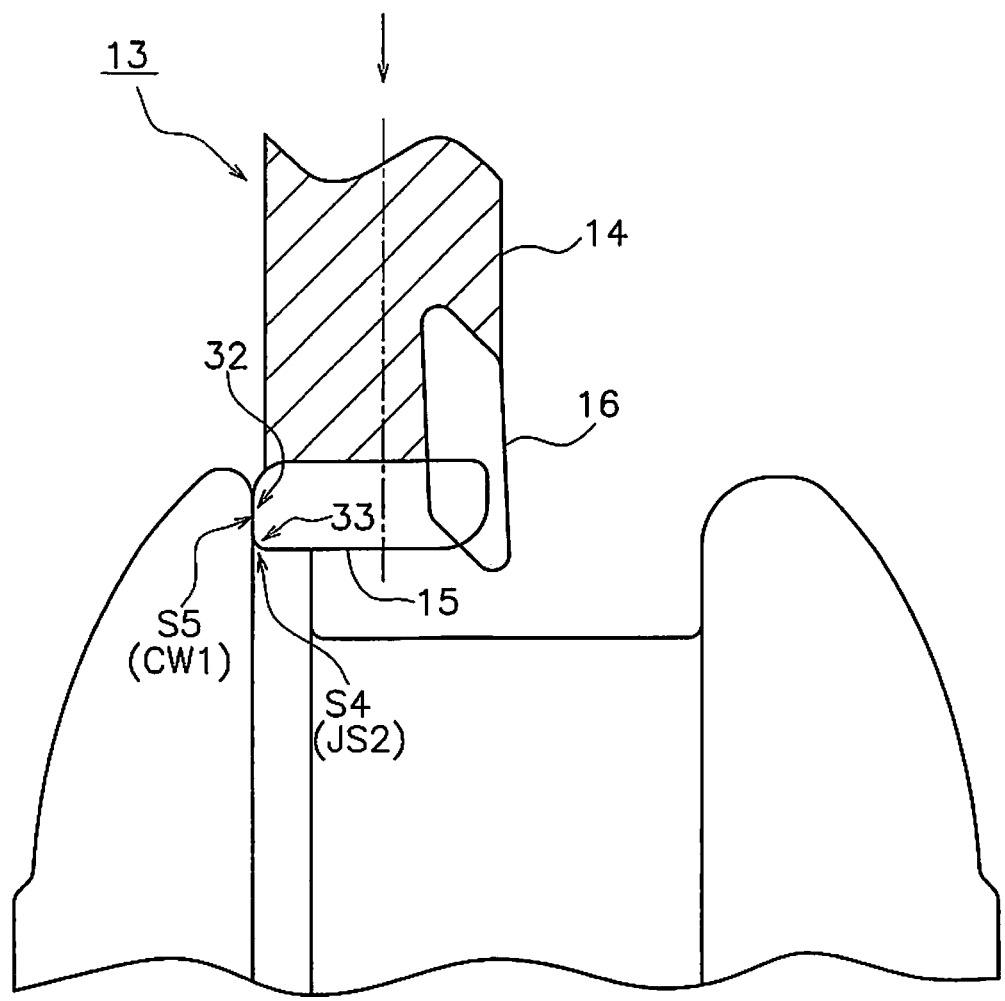
FIG. 7 is a view for explaining milling by the first cutter and a second cutter.

Next, as illustrated in FIG. 7, the first cutter 13 is moved toward the side of the first pin journal PJ1, and the side surface S5 of the first counterweight CW1 is cut by the side surface blade part 32 of the first chip 15 and the step S4 of the second journal thrust JS2 is cut by the step blade part 33 of the first chip 15.

Figure 8:
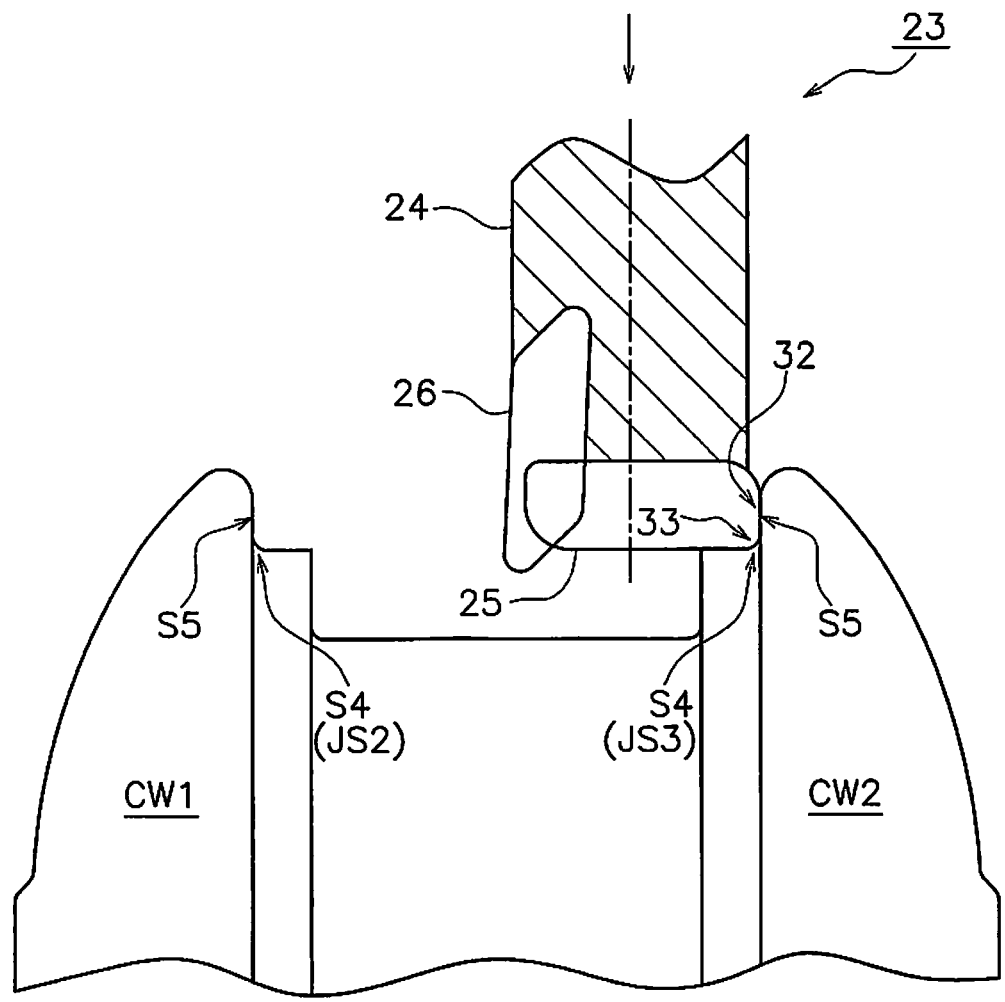
FIG. 8 is a view for explaining milling by the first cutter and a second cutter.

Next, as illustrated in FIG. 8, the second cutter 23 is moved toward the side of the first pin journal PJ1, and the side surface S5 of the second counterweight CW2 is cut by the side surface blade part 32 of the first chip 25 and the step S4 of the third journal thrust JS3 is cut by the step blade part 33 of the first chip 25.

Figure 9:
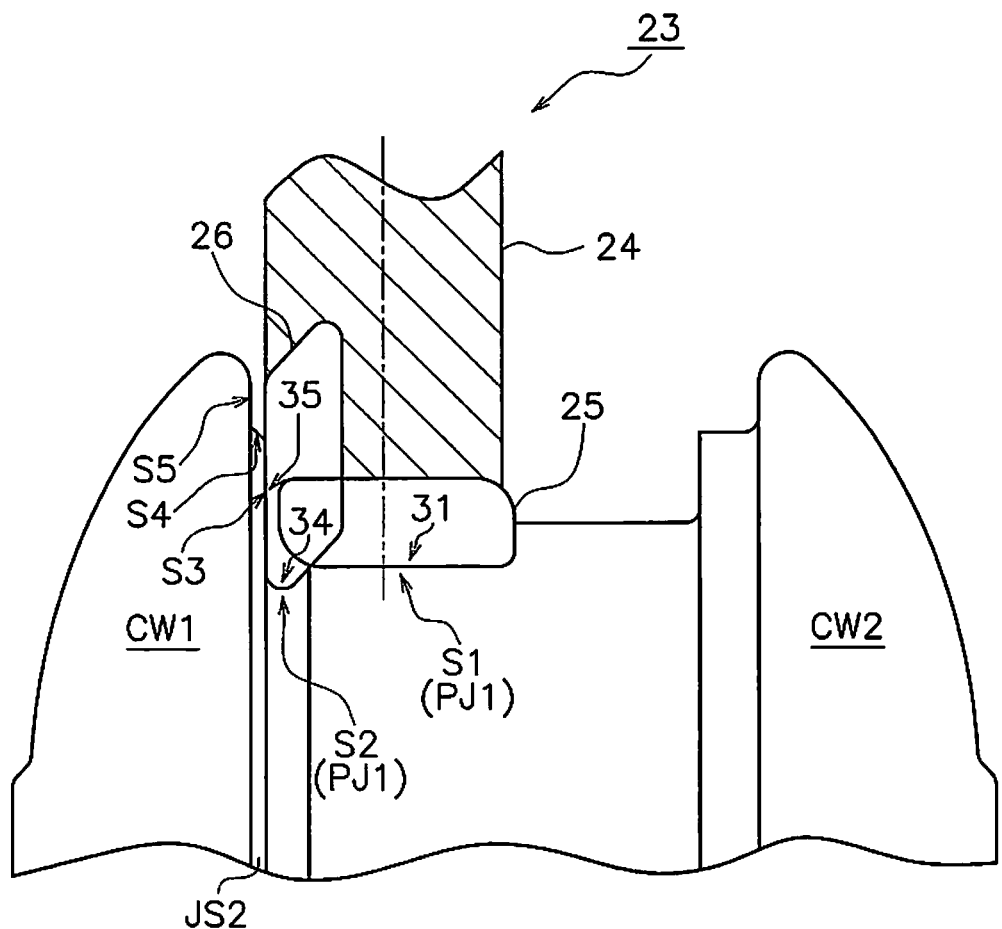
FIG. 9 is a view for explaining milling by the first cutter and a second cutter.

Next, as illustrated in FIG. 9, while the second cutter 23 is positioned at the side of the first pin journal PJ1, one side of the external circumferential surface S1 of the first pin journal PJ1 is cut by the external circumferential surface blade part 31 of the first chip 25, the side surface S3 of the second journal thrust JS2 is cut by the side surface blade part 35 of the second chip 26, and the groove S2 at one end part in the axial direction of the external circumferential surface S1 of the first pin journal PJ1 is cut by the groove blade part 34 of the second chip 26.

Figure 10:
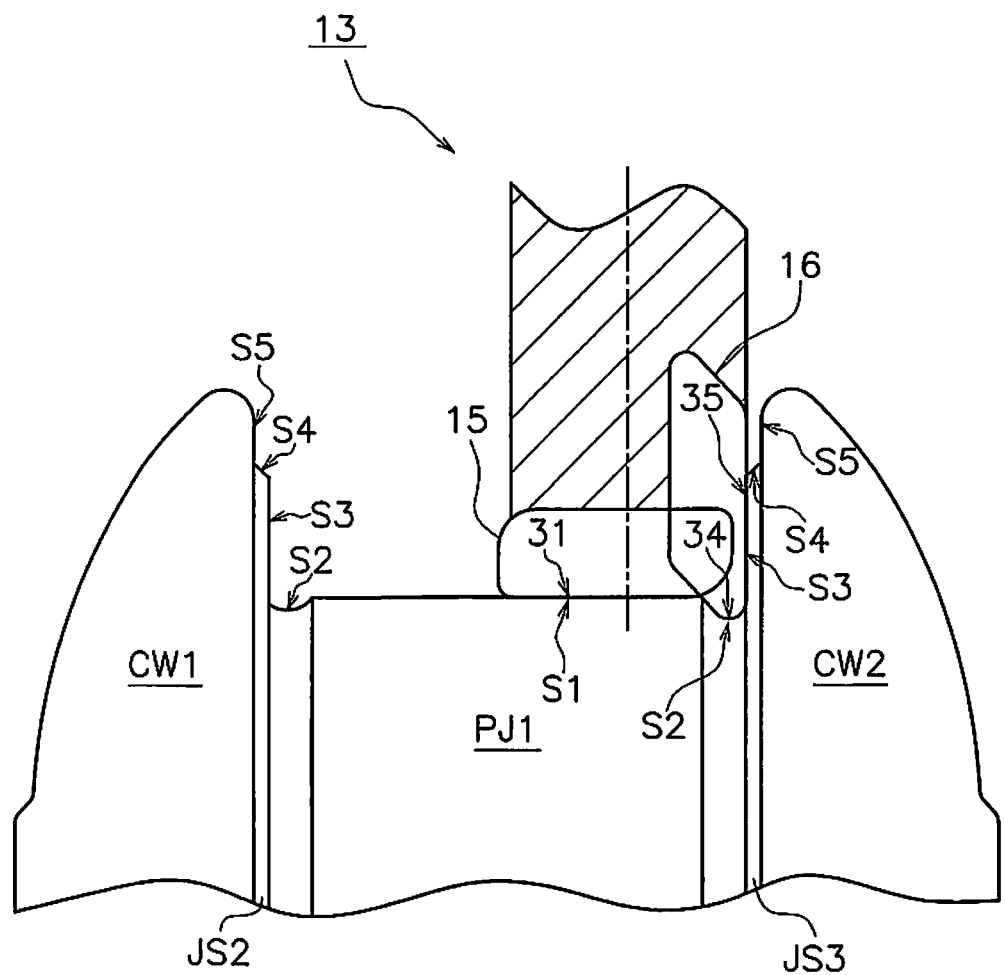
FIG. 10 is a view for explaining milling by the first cutter and a second cutter.

Next, as illustrated in FIG. 10, the first cutter 13 is moved toward the side of the first pin journal PJ1, and the remainder of the external circumferential surface S1 of the first pin journal PJ1 is cut by the external circumferential surface blade part 31 of the first chip 15, the side surface S3 of the third journal thrust JS3 is cut by the side surface blade part 35 of the second chip 16, and the groove S2 at the other end in the axial direction of the external circumferential surface S1 of the first pin journal PJ1 is cut by the groove blade part 34 of the second chip 16.

Due to the above operations, the milling in the vicinity of the first pin journal PJ1 is completed.

(Characteristics)

(1) The first cutter 13 according to the present embodiment has the annular main body part 14, the first chip 15 for cutting the external circumferential surface S1 of the first pin journal PJ1, and the second chip 16 for cutting the groove S2 of the external circumferential surface S1 of the first pin journal PJ1. The first chip 15 and the second chip 16 are both attached to an internal circumferential surface 14S of the main body part 14.

The cutting of the external circumferential surface S1 of the pin journal PJ1 and the forming of the groove S2 can be performed on each side by the first cutter 13 in this way. As a result, milling can be performed without replacing the first cutter 13 even when fabricating the crankshaft 2a with different pin journal PJ1 widths or when the widths of pin journals PJ and the main journals MJ are different. Therefore, the work efficiency of the milling can be improved because replacement of the cutter is not required when the first cutter 13 is used.

(2) The first chips 15 of the first cutter 13 according to the present embodiment each have the side surface blade part 32 for cutting the side surface S5 of the first counterweight CW1.

Therefore, the work efficiency of the milling can be improved because the cutting of the side surface S5 of the first counterweight CW1 can be performed by the first cutter 13.

(3) The first chips 15 of the first cutter 13 according to the present embodiment each have the step blade part 33 for cutting the step S4 of the second journal thrust JS2 on the side surface S5 of the first counterweight CW1.

Therefore, the work efficiency of the milling can be improved because the cutting of the step S4 of the second journal thrust JS2 can be performed by the first cutter 13.

(4) The second chips 16 of the first cutter 13 according to the present embodiment each have the side surface blade part 35 for cutting the side surface S3 of the third journal thrust JS3.

Therefore, the work efficiency of the milling can be further improved because the cutting of the side surface S3 of the third journal thrust JS3 can be performed by the first cutter 13.

Other Embodiments

The present invention is not limited to the above embodiment and various changes and modifications may be made without departing from the spirit of the invention.

A configuration of the inner blade type first cutter 13 in which the first chips 15 and the second chips 16 are attached to the internal circumferential surface 14S of the main body part 14 has been explained in the above embodiment. However, the first chips 15 and the second chips 16 may be attached to the external circumferential surface 14T of the main body part 14. That is, the cutter according to the present invention can be applied to an outer blade type of cutter as well as the inner blade type.

While the plurality of first chips 15 are exposed to the first side surface 14P and the plurality of second chips 16 are exposed to the second side surface 14Q in the first cutter 13 according to the above embodiment, the attachment positions of the first chips 15 and the second chips 16s may be reversed. That is, the plurality of first chips 15 may be exposed to the second side surface 14Q and the plurality of second chips 16 may be exposed to the first side surface 14P. In this case, the second cutter 23 may have the same configuration as the first cutter 13 and may be attached while rotated 180 degrees with respect to the first cutter 13.

While the milling in the vicinity of the first pin journal PJ1 is described as being performed by the first cutter 13 and the second cutter 23 in the above embodiment, the milling performed by the first cutter 13 and the second cutter 23 may also be performed in the vicinity of any of the pin journals PJ and in the vicinity of any of the main journals MJ in addition to the first pin journal PJ1.

Figure 11:
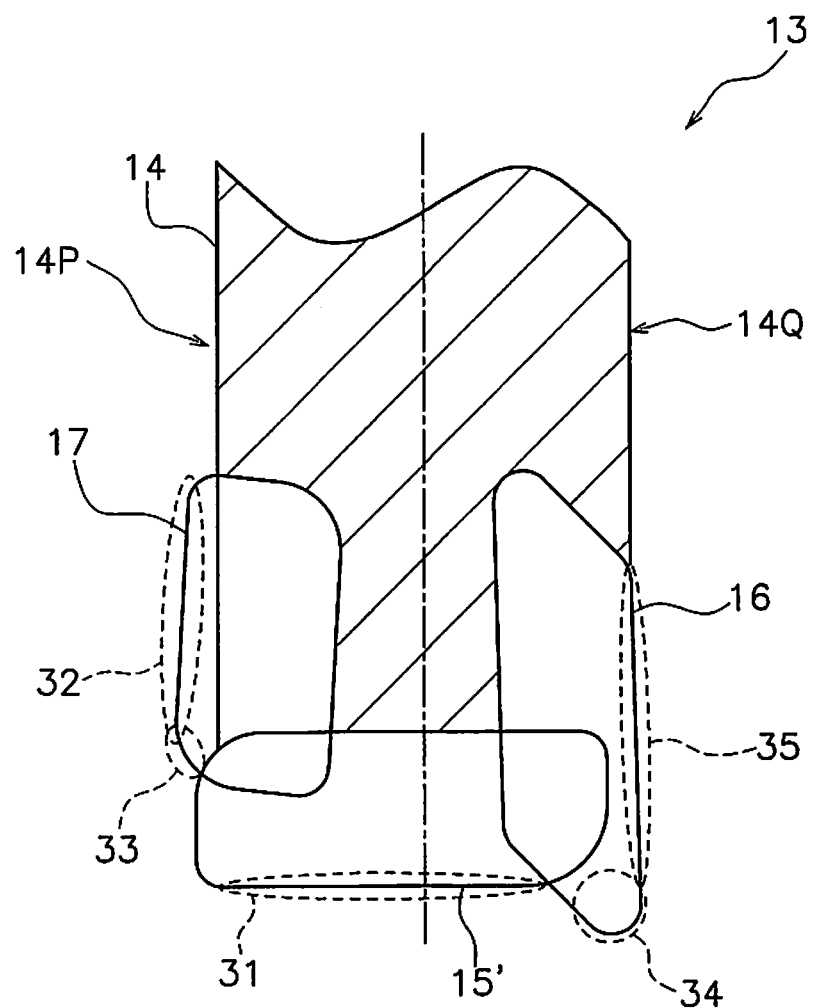
FIG. 11 is a virtual cross-sectional view which depicts a first chip, a second chip and a third chip overlapping each other in the first cutter.

While the first cutter 13 has the first chips 15 and the second chips 16 in the above embodiment, the first cutter 13 may also have first chips 15', the second chips 16, and third chips 17 as depicted in FIG. 11. The first chips 15' protrude further in the radial direction than the third chips 17. The third chips 17 are disposed on the opposite side from the second chips 16 in the axial direction. The third chips 17 do not overlap the center line 14a of the main body part 14 in the axial direction. The third chips 17 each have the side surface blade part 32 and the step blade part 33 formed on the first chips 15 according to the above embodiment, and the first chips 15' only have the external circumferential surface blade part 31. By providing the third chips 17 in the first cutter 13 in this way, the load on the first chips 15' can be reduced thereby increasing the useful life of the first cutter 13.

The milling in the vicinity of the first pin journal PJ1 has been explained with reference to FIGS. 7-10 in the above embodiment. However, the order of the milling is not limited to the above explanation. The order of the steps in FIGS. 7-10 may be switched as so long as the step depicted in FIG. 9 is performed after the step depicted in FIG. 7, and the step depicted in FIG. 10 is performed after the step depicted in FIG. 8. For example, the milling may be performed in any of the following orders: FIG. 7→FIG. 9→FIG. 8→FIG. 10, FIG. 7→FIG. 8→FIG. 10→FIG. 9, FIG. 8→FIG. 7→FIG. 9→FIG. 10, or FIG. 8→FIG. 7→FIG. 10→FIG. 9.

The invention claimed is:

1. A cutter for performing milling on a crankshaft blank having a journal and a counterweight coupled to the journal, the cutter comprising:
   an annular main body part centered on a predetermined axis center;
   a first chip attached to a circumferential surface of the main body part and usable to cut an external circumferential surface of the journal, the first chip having an external circumferential surface blade part usable to cut the external circumferential surface of the journal, a side surface blade part usable to cut a side surface of the counterweight, and a step blade part usable to form a step of a journal thrust provided between the journal and the counterweight; and
   a second chip attached to the circumferential surface of the main body part and usable to cut a groove on the external circumferential surface of the journal, the second chip having a groove blade part usable to cut the groove on the external circumferential surface of the journal.

2. The cutter according to claim 1, wherein
   as seen in a plan view of the circumferential surface, the first chip overlaps a center line of the main body part in an axial direction parallel to the axis center, and
   as seen in a plan view of the circumferential surface, the second chip is spaced away from the center line of the main body part in the axial direction.

3. The cutter according to claim 1, wherein
   the second chip has a side surface blade part usable to cut a side surface of the journal thrust.

4. The cutter according to claim 1, further comprising:
   a third chip attached to a circumferential surface of the main body part and usable to cut a side surface of the counterweight; and
   the third chip has a side surface blade part usable to cut the side surface of the counterweight.

5. The cutter according to claim 4, wherein
   the third chip has a step blade part usable to form a step on the side surface of the counterweight.

6. The cutter according to claim 5, wherein
   the first chip protrudes further than the third chip in a radial direction centered on the axis center.

7. The cutter according to claim 1, wherein
   a tip end part of the second chip protrudes further than the first chip in a radial direction centered on the axis center.

8. The cutter according to claim 1, further comprising
   a plurality of first chips that includes the first chip, and
   a plurality of second chips that includes the second chip,
   the plurality of first chips and the plurality of second chips are disposed in an alternating manner in the circumferential direction centered on the axis center.

9. A crankshaft miller including first and second cutters as set forth in claim 1, the crankshaft miller further comprising:
   a first adaptor supporting the first cutter;
   a second adaptor supporting the second cutter,
   the second chip of the first cutter facing the second cutter, and
   the second chip of the second cutter facing the first cutter.

* * * * *